June 7, 1932.  R. K. LEE  1,862,153
PIPE JOINT
Filed Sept. 20, 1929
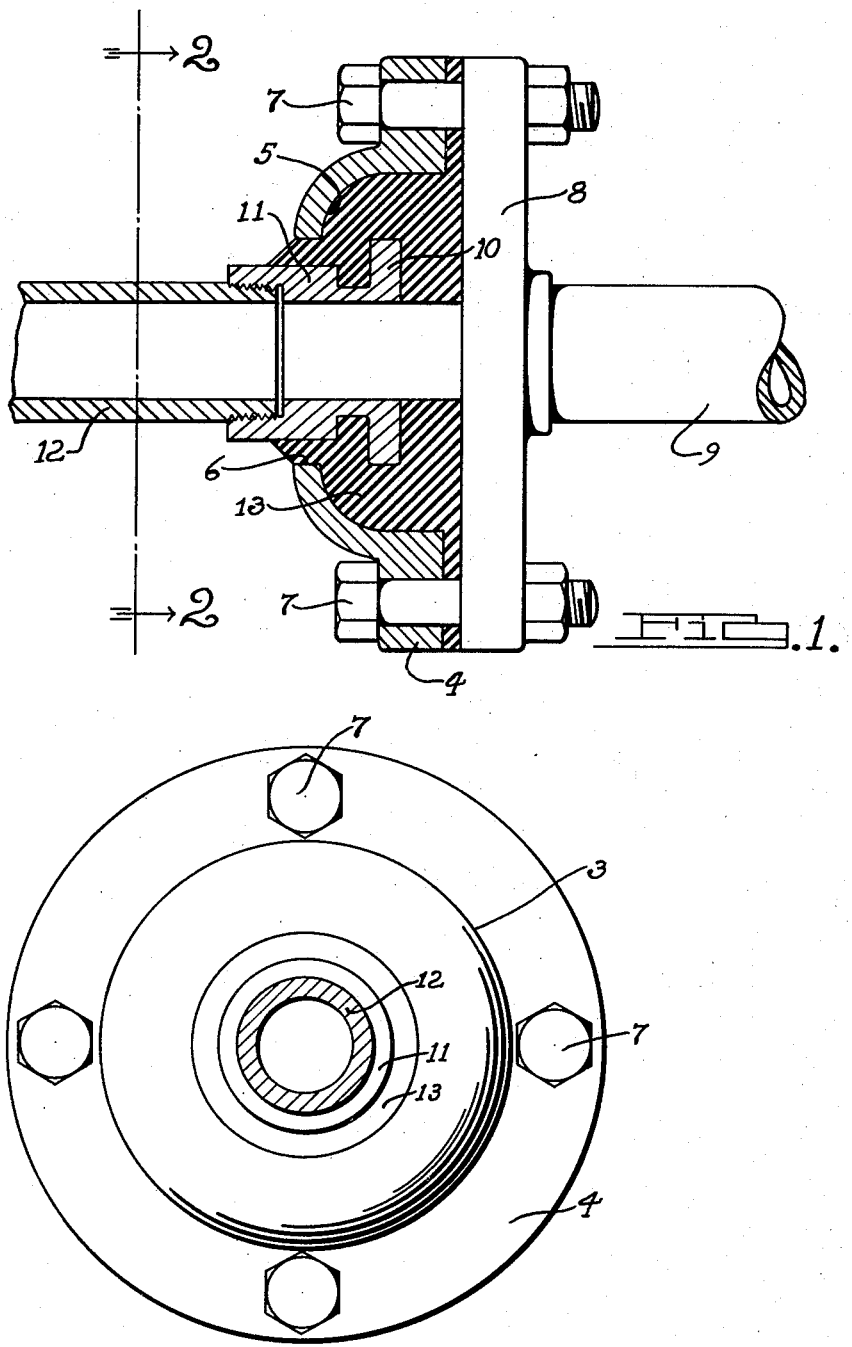
INVENTOR
ROGER K. LEE.
BY
ATTORNEY Patented June 7, 1932

1,862,153

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

PIPE JOINT

Application filed September 20, 1929. Serial No. 393,913.

This invention relates to pipe joints.

The main objects of this invention are to provide an improved construction of pipe joints in which the two joined pieces of pipe may have limited universal movement with respect to each other; to provide a pipe joint in which there will be no direct metallic contact between the two joined pieces of pipe; and to provide a pipe joint which will relieve the adjacent ends of the connected pipes from undue vibration, thus lessening the possibility of breakage.

An illustrative embodiment of this invention is shown in the accompanying drawing in which—

Fig. 1 is a medial sectional view of the improved joint, bolted to a standard pipe flange, which is shown in elevation.

Fig. 2 is a sectional view taken of the line 2—2 of Fig. 1 looking in the direction indicated by the arrows.

In the construction shown in the drawing, the improved joint comprises an outer member 3 which has a radially extending annular flange 4 and a recessed portion 5. The recessed portion has an annular, axially extending opening 6 therethrough. The flange 4 is drilled to receive a plurality of bolts 7 by which it may be secured face to face against a standard pipe flange 8 into which is threaded the end of a pipe or tube 9.

The recessed portion 5 of the outer member houses an annular flanged head 10 of an inner tubular member 11 which extends axially through the opening 6 in spaced relation thereto. The end of the inner member 11, opposite to the head 10, protrudes beyond the outer face of the outer member and is interiorly threaded to receive the threaded end of a pipe or tube 12 which is normally in substantially axial alignment with the tube 9.

The inner member 11, including the head 10, is in spaced relation to the interior walls of the recess 5, and such space is filled with yieldable rubber 13 which is securely bonded to its contacting surfaces by vulcanization. The rubber also preferably extends over the entire inner face of the flange 4 so as to serve as a gasket between said flange and the pipe flange 8.

In the use of this improved pipe joint, one of the opposed sections of pipe to be connected, is threaded into the member 11 and the other in the standard pipe flange 8. The flange 4 of the outer member 3 is then bolted securely against the face of the flange 8 in the usual manner. By reason of the vulcanized bond between the rubber 13 and the inner and outer members 11 and 3 respectively, a liquid tight joint is thus secured between the pipes 9 and 12.

By reason of the spaced relation of the inner and outer members and the yieldable bond therebetween, the pipes 9 and 12 may have limited universal movement with respect to each other and the rubber connection relieves the adjacent ends of the pipe from excessive vibration and strain due to improper alignment, thereby greatly reducing the possibility of crystallization and subsequent structural failure of the pipe ends.

Although but one specific embodiment of this invention has herein been shown and described it will be understood that numerous details of the construction shown may be altered or omitted without departing from the spirit of this invention, as defined by the following claims.

I claim:—

1. The combination of a pair of opposed members having a liquid passage therethrough, a joint connecting said members comprising an inner metal joint member connected to one of said opposed members and having a liquid passage communicating with the passage of the latter member, an outer joint member spaced from said inner joint member having a liquid passage therein and connected to the other of said opposed members and rubber in the space between said joint members having a liquid passage communicating with the passages of said inner and outer joint members, said rubber being vulcanized to the adjacent surfaces of said joint members and forming a liquid tight seal therebetween.

2. A flexible joint for liquid conducting tubes including an outer member having a liquid passage and an inturned flange providing a restricted opening, an inner metal member having a liquid passage and a shank portion extending through said opening, and in spaced relation to said flange, a head on the inner end of said inner member, fastening means on the outer end of said inner member for attachment to a liquid conducting tube, and a yieldable rubber mass between the adjacent surface of said members and extending between the inner periphery of said flange and inner member, said rubber being bonded to said surfaces and adapted to maintain a liquid tight seal between said members when portions of the rubber mass are placed under tension during flexure of said joint.

3. A joint of the class described comprising an outer member having a liquid passage and an inturned flange providing a restricted opening, an inner metal member having a liquid passage and a shank portion extending through said opening, and in spaced relation to said flange, fastening means on the outer end of said inner member for attachment to a liquid conducting tube, and rubber interposed between the adjacent surface of said members yieldably spacing all portions of said members apart, said rubber being vulcanized to said surfaces and adapted to maintain a liquid tight seal between said members when portions of said rubber are placed under tension during flexure of said joint.

4. A joint of the class described, comprising an outer member having a recess therein with an opening through the bottom of the recessed portion, an inner metal member extending through said opening in spaced relation to the walls thereof, a head on said inner member located in said recess, and rubber interposed between said inner member and walls of said opening and between said head and the walls of said recess, said rubber being bonded to one of said members and adapted to maintain a liquid seal between said members while permitting a universal movement therebetween.

5. A joint of the class described, comprising an outer member having a recess therein with an opening through the bottom of the recessed portion, an inner metal member extending through said opening in spaced relation to the wall thereof, a head on said inner member located in said recess, and rubber interposed between said inner member on the walls of said opening and between said head and the walls of said recess, said rubber being vulcanized to one of said members and adapted to maintain a liquid tight seal between said members during relative universal movement thereof.

6. A joint of the class described comprising an outer member having a radially extending flange and a portion surrounded by said flange providing a recesss, said recessed portion having an axially extending opening therethrough, a tubular metal member extending through said opening in spaced relation to the walls thereof, a radially extending flange head on the inner end of said tubular member, said head being housed in said recess in spaced relation to the walls thereof, yieldable resilient material filling said recess and yieldably spacing said tubular member from the walls of said opening, and the space between said members, said material being bonded to said inner member.

ROGER K. LEE.